United States Patent [19]

Cole

[11] Patent Number: 5,131,089

[45] Date of Patent: Jul. 14, 1992

[54] SOLID STATE DISK DRIVE EMULATION

[75] Inventor: James F. Cole, Fremont, Calif.

[73] Assignee: GRiD Systems Corporation, Fremont, Calif.

[21] Appl. No.: 413,803

[22] Filed: Sep. 28, 1989

Related U.S. Application Data

[63] Continuation-in-part of Ser. No. 365,147, Jun. 12, 1989.

[51] Int. Cl.$^5$ .................. G06F 12/00; G06F 9/455
[52] U.S. Cl. ................... 395/500; 395/425; 364/232.3; 364/254.8; 364/255
[58] Field of Search ... 364/200 MS File, 900 MS File

[56] References Cited

U.S. PATENT DOCUMENTS

| | | | |
|---|---|---|---|
| 4,295,205 | 10/1981 | Kunstadt | 364/900 |
| 4,476,526 | 10/1984 | Dodd | 364/200 |

FOREIGN PATENT DOCUMENTS

| | | |
|---|---|---|
| 2093236 | 8/1982 | United Kingdom . |
| 2172126 | 9/1986 | United Kingdom . |

Primary Examiner—Michael R. Fleming
Assistant Examiner—Debra A. Chun
Attorney, Agent, or Firm—Townsend & Townsend

[57] ABSTRACT

A system for causing a computer solid state memory to emulate a magnetic disk mounted in a disk drive. In the preferred embodiment, the system includes two removable RAM cards and two ROM's. Program instructions encoded in firmware in the system BIOS translate disk service requests from software running on the computer into appropriate commands and addresses on the RAM cards or on the ROM. The system permits software written for use with floppy disks to be used with solid state memory devices such as RAM cards or ROM without modification of the software.

7 Claims, 3 Drawing Sheets

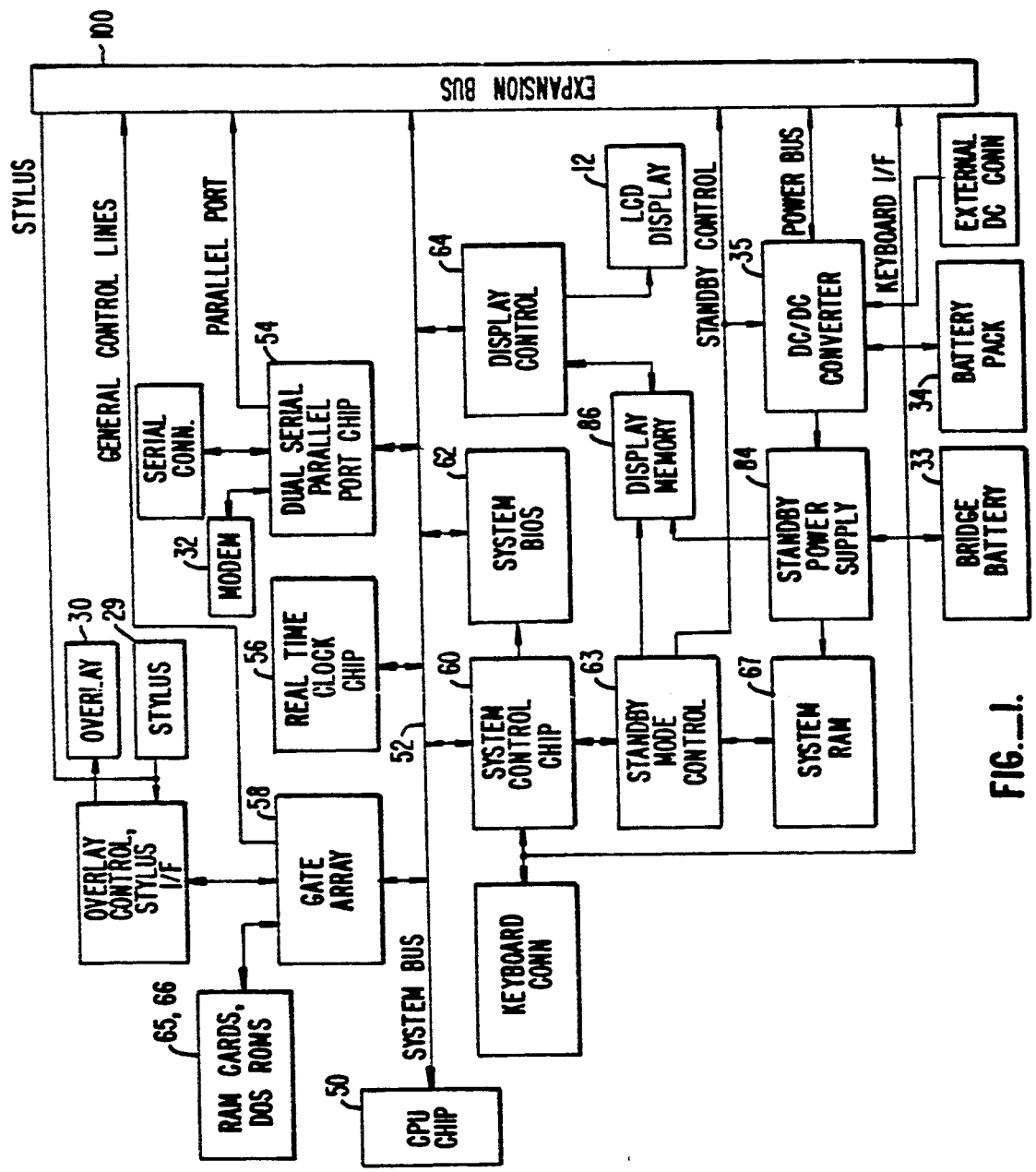
FIG._1.

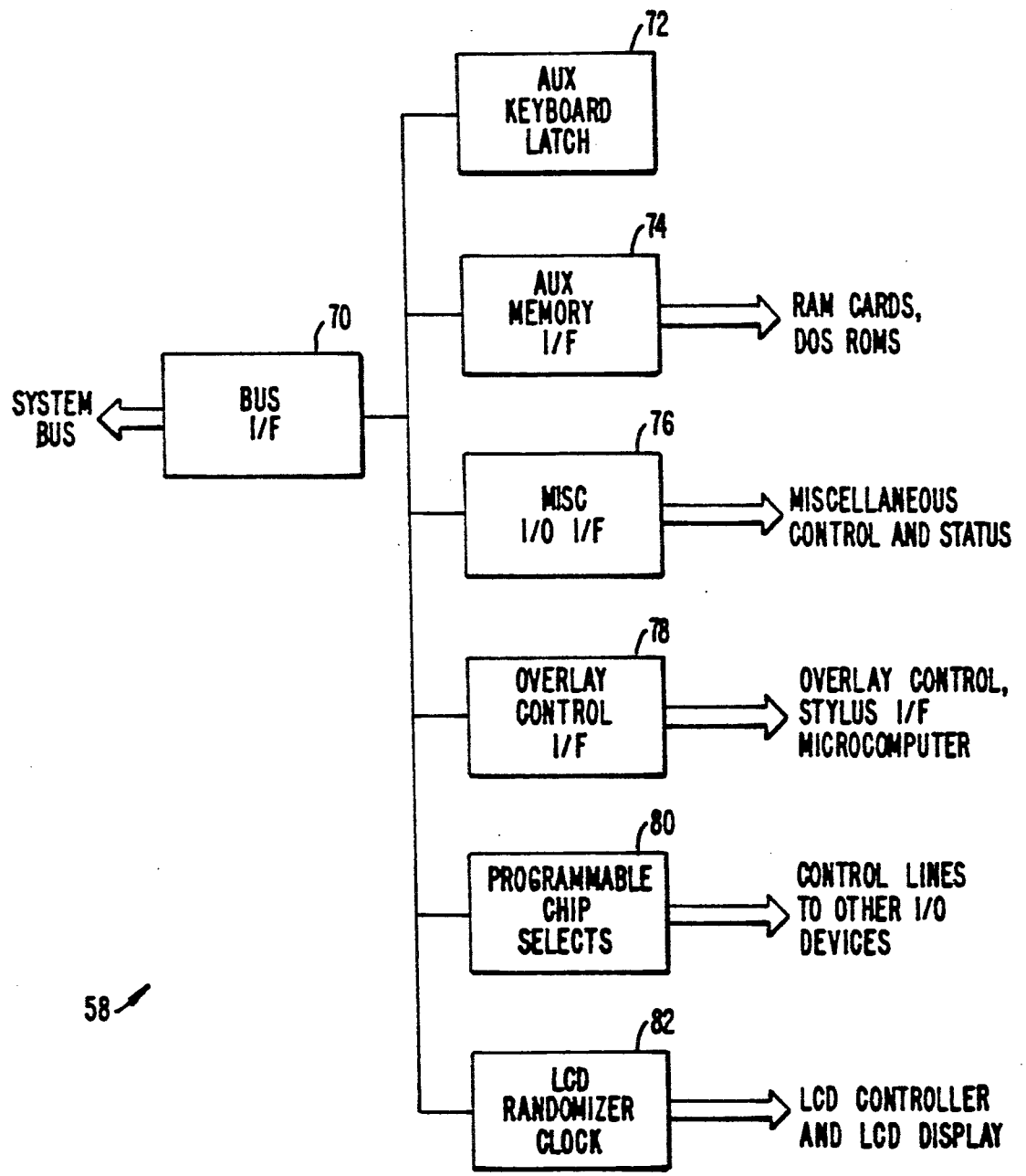
FIG._2.

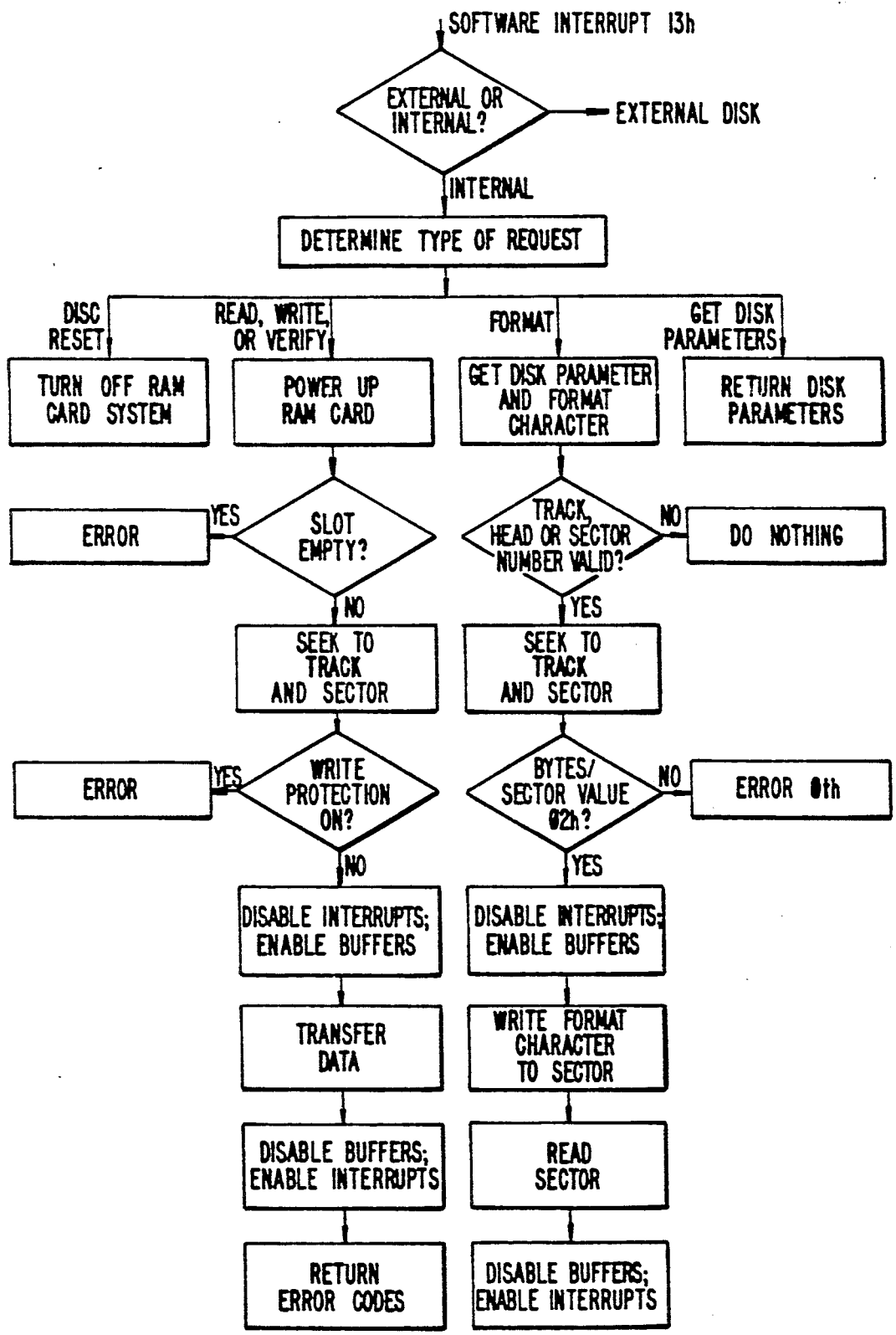
FIG._3.

SOLID STATE DISK DRIVE EMULATION

BACKGROUND OF THE INVENTION

This application is a continuation-in-part of application Ser. No. 07/365,147 for a Hand Held Computer filed Jun. 12, 1989, and assigned to the same assignee as the present invention. This invention relates to a system and method for enabling solid state computer memory devices (such as RAM cards, ROM's and EPROM's) to be accessed as though they were a magnetic disk in a disk drive attached to the computer.

Magnetic disks, such as "floppy" disks and "hard" disks, have become the standard long term storage media in the computer industry. Conventional magnetic disk drives, however, are large and heavy relative to other forms of permanent data storage. There are therefore situations in which use of a magnetic disk to store computer data would be undesirable. One example of such a situation is in a portable hand held computer, such as described in application Ser. No. 07/365,147, filed Jun. 12, 1989, the disclosure of which is incorporated herein be reference. The hand held computer disclosed as the preferred embodiment in that application uses RAM cards and ROM in place of magnetic disks and disk drives for data storage.

SUMMARY OF THE INVENTION

Because magnetic disks are the industry standard, much computer software has been written assuming that data will be stored on and retrieved from a magnetic disk mounted in a disk drive in communication with the computer. Thus, in order for a computer to use a storage medium other than a magnetic disk, one of two choices must be made: (1) rewrite the software to reflect the change in memory storage medium, or (2) make the alternative storage medium appear to the software to be a magnetic disk mounted in a disk drive in communication with the computer.

This invention provides a system for enabling an alternative data storage medium to appear to computer software as a magnetic disk mounted in a disk drive. In the preferred embodiment, two removable RAM cards and two ROM's are used to emulate a magnetic disk mounted in a disk drive.

BRIEF DESCRIPTION OF THE DRAWINGS

FIG. 1 is a block diagram of a computer using the disk emulation system of this invention.

FIG. 2 is a block diagram of a customized gate array according to this invention.

FIG. 3 is a flow chart showing the operation of the disk drive emulation system of this invention.

DETAILED DESCRIPTION OF THE PREFERRED EMBODIMENT

The preferred embodiment of this invention is used with a hand held, portable computer, such as the computer disclosed in the patent application referred to above. The computer is a stand alone data processor capable of running standard personal computer programs as well as specially designed software. FIG. 1 is a block diagram of the major components of the computer. Only the components relevant to this invention will be discussed here.

In the preferred embodiment, the computer's internal memory consists of removable RAM 65, system ROM 66, and system RAM 67. The use of removable RAM 65 and system ROM 66 in place of conventional disk drives minimizes the size and weight of the computer.

The removable RAM 65 contains software specific to the computer's application. Removable RAM 65 is preferably two Epson I memory cards with an 8 bit bus and 40-pin card edge connectors. Each has a small battery associated with it to maintain data for six or more months without drawing on the main power unit. Removable RAM 65 may be made in accordance with the disclosure of copending patent application Ser. No. 07/364,922 entitled "Memory Card With Removal Tab" filed Jun. 12, 1989, assigned to the same assignee as the present invention and incorporated herein by reference.

System ROM 66 stores the basic operating system for the computer. In the preferred embodiment, system ROM consists of two 27C010 type, 128 k by 8 bit EPROM's, but mask type ROM's may be used instead. The basic operating system is preferably MS-DOS.

The system BIOS is a set of programs built into the computer that perform the most basic, low-level control and supervision operations for the computer. The BIOS is an interface between the computer's hardware and the software programs running on the computer. The use of a system BIOS in a computer is well-known in the art. In the preferred embodiment, system BIOS 62 is a standard IBM-compatible Input/Output System consisting of two EPROM's modified as discussed below. System control chip 60 is a Chips and Technologies 82C100 Super XT system controller.

Instructions encoded as firmware in the system BIOS 62 of this invention control the interaction of the RAM cards 65 and system ROM 66 with the rest of the computer. The two MS-DOS ROM's 66 are concatenated by the BIOS 62 into one virtual disk device. The two RAM cards, in turn, are treated as two separate virtual disks. Thus, the system emulates three floppy disk drives. The interaction of the BIOS and the removable RAM 65 and system ROM 66 is discussed below.

As shown in FIG. 1, RAM 65 and ROM 66 communicate with BIOS 62 through a customized gate array 58. FIG. 2 shows a schematic layout of gate array 58. A standard bus interface and internal decode block 70 communicates with system bus 52. Connected to interface 70 are an auxiliary keyboard block 72; an auxiliary memory interface block 74; a miscellaneous input/output interface block 76; an overlay processor interface block 78; a programmable chip select block 80; and an LCD randomizer clock block 82. Only the auxiliary memory interface block is relevant here.

Auxiliary memory interface block 74 provides buffers and control ports to allow access to removable RAM 65 and non-removable system ROM 66. Interface 74 is a standard paged interface with a 64 k page size and a data bus 8 bits wide, as is known in the art. The actual paging occurs in response to an address value generated by the RAM/ROM driver in the BIOS, as discussed below. Only one of the four devices (i.e., the two RAM cards and the two ROM's) may be accessed at a time. To select a device, the RAM/ROM driver program sets the appropriate bits in the Auxiliary Memory Select Port. A Status Port is provided to allow determination of storage card type and presence. A Page Register Port is used to select the active 64 k byte page in the selected device.

The system of the preferred embodiment supports RAM cards sizes between 32 k and 1024 k and ROM's between 32 k and 512 k. The system converts the RAM cards and ROM's into virtual disks having identifiable cylinders, heads and sectors. The RAM cards and ROM's correspond to disk layouts in the following manner:

| Size | Cylinders | Heads | Sectors | Leftover |
|------|-----------|-------|---------|----------|
| 32k | 3 | 2 | 9 | 5120 |
| 64k | 7 | 2 | 9 | 1024 |
| 128k | 14 | 2 | 9 | 2048 |
| 256k | 28 | 2 | 9 | 4096 |
| 512k | 56 | 2 | 9 | 8192 |
| 1024k | 56 | 2 | 18 | 16384 |

The first sector of the zeroth track starts at offset 200 h in the first page (page 0). Each sector is 512 bytes long, and the sectors are mapped contiguously. The starting address of the first sector is such that a sector never wraps to another page, eliminating any need to create a flat address space. The "leftover" is the memory space on the RAM or ROM which will not make a complete cylinder. This memory space is not used.

The BIOS must be told certain basic information regarding the RAM card or DOS ROM. This information is stored in the first page (page 0) of the RAM card and is organized as follows:

| Address | # of bytes | Use |
|---------|------------|-----|
| 000000h | 2 | Size of RAM/ROM in kilobytes |
| 000003h | 1 | Sectors Checksummed flag |
| 000004h | 2 | Address of first checksum |
| 000006h | 2 | Header ID (+ AA55h) |

Each RAM card has a disk parameter block which corresponds to standard IBM-defined disk parameters. The disk parameters have been modified, however, to reflect the various sizes of the RAM cards and ROM's. The fields of the block and their values for the various RAM card sizes are as follows:

| Field | 32k | 64k | 128k | 256k | 512k | 1024k |
|-------|-----|-----|------|------|------|-------|
| Specify parm 1 | 0DFh | 0DFh | 0DFh | 0DFh | 0DFh | 0DFh |
| Specify parm 2 | 02h | 02h | 02h | 02h | 02h | 02h |
| Motor timeout count | 37 | 37 | 37 | 37 | 37 | 37 |
| log2 (sector size/128) | 02h | 02h | 02h | 02h | 02h | 02h |
| Maximum sector # | 9 | 9 | 9 | 9 | 9 | 18 |
| Read/Write gap length | 00h | 00h | 00h | 00h | 00h | 00h |
| Sector size if < 128 | −1 | −1 | −1 | −1 | −1 | −1 |
| Format gap length | 80 | 80 | 80 | 80 | 80 | 80 |
| Format fill character | 0F6h | 0F6h | 0F6h | 0F6h | 0F6h | 0F6h |
| Head settle time | 01h | 01h | 01h | 01h | 01h | 01h |
| Motor on delay (⅛ sec) | 0 | 0 | 0 | 0 | 0 | 0 |
| Maximum track # | 3 | 7 | 13 | 28 | 56 | 56 |
| Data rate | 80h | 80h | 80h | 80h | 80h | 80h |

The disk parameters for the ROM correspond to the 256 k column for the two concatenated ROM's The computer of the preferred embodiment also has a provision for connection to an external disk drive (not shown). The BIOS must therefore be able to distinguish between a request for an external disk drive and a request for an internal RAM card or MS-DOS ROM. If the request is for an external drive, the BIOS acts in a standard manner to access that device. If, however, the request is for MS-DOS or for data or program steps stored on the RAM cards, the BIOS performs a specially-designed program sequence (referred to below as the "RAM/ROM driver") which makes the RAM cards and/or the MS-DOS ROM's appear as floppy disks to the software making the request. As shown schematically in FIG. 3, the sequence of events for a software disk service request is as follows:

1. BIOS receives software interrupt 13 h—floppy disk service request.
2. BIOS determines whether the request is for a physical floppy disk or a RAM card/MS-DOS ROM. If an external drive is attached to the system, the internal MS-DOS ROM's are shut off, and all MS-DOS requests are referred to the external drive.
3. If the request is for a RAM card/MS-DOS ROM, program control is given to the RAM/ROM driver in the BIOS. This driver takes different actions depending on the type of service request:
   a. Disk reset request—turn the RAM card system or ROM off;
   b. Read, Write, or Verify request—
      i. Power up the RAM card system or ROM;
      ii. Check to make sure the slot for the specified disk is not empty. Return an error if it is;
      iii. Seek to the specified head, track and sector. The head, track and sector is translated into a specific RAM card address by a conversion formula which depends on the capacity of the RAM card or ROM. The conversion translates the cylinder, head and sector address to a RAM or ROM address in a conventional manner as shown in the table above. For the MS-DOS ROM's, the system determines whether the specified address is on the first ROM or second ROM. If on the second, BIOS subtracts 14 from the specified track before accessing the second ROM;
      iv. If the request is a write, check write protection. A physical switch on the RAM card provides the user with a way to write-protect the RAM card. The ROM's are always write-protected;
      v. Immediately before the data is read or written, disable interrupt and enable the RAM card or ROM read/write buffers. With interrupts disabled, no other software can execute. This keeps other software from corrupting the data on a RAM card by accidentally writing to its address range;
      vi. Transfer data with 8086 string instruction;
      vii. Disable the RAM card or ROM read/write buffers and re-enable interrupts. With the read/write buffers disabled, writes to the RAM card address range do not change the data on the RAM card; and
      viii. Return any error codes to the program that requested disk service.
   c. Format request (for RAM cards only)— i. Get the disk parameter block for this media type, and get the format character;

ii. For each sector to be formatted: (1) check track, head, and sector number for validity; (2) if out of range, do nothing; if in range, seek to that track and sector; (3) check the bytes/sector value; if not 02 h, return error 01 h; (4) disable interrupts and enable the RAM card read/write buffers; (5) write the format character to that sector; (6) read the sector to ensure that it was formatted properly; (7) disable the RAM card read/write buffers and enable interrupts.

d. Get disk parameters request—return the disk parameters for the maximum capacity RAM card/MS-DOS ROM the drive can use.

A list of the source code implementing this system is attached to the end of this specification.

The driver must wait a short period of time after powering up the RAM card system before accessing it. Therefore, after a service request is completed, the RAM card system and MS-DOS ROM system are left powered on. Leaving the system powered up improves performance but consumes more power than powering it off. Two seconds after the last RAM card/MS-DOS ROM operation, therefore, the RAM card system and ROM system power is shut off.

While the system of this invention has been disclosed for use with RAM cards and EPROM's in a hand held computer, the system may be used in other operating environments as well.

What is claimed is:

1. A disk drive emulation system for a computer comprising:

solid state memory having an on state and an off state and specifiable data addresses; and an input/output system for interfacing between computer hardware and computer software, the input/output system comprising emulation means for causing the solid state memory to emulate a magnetic disk mounted in a disk drive, the emulation means comprising:

means for receiving a software disk service request;

means responsive to receipt of a software disk service request for blocking receipt of a subsequent request until the received request has been completed;

firmware means for determining the type of software disk service request;

firmware means responsive to the determining means for reading from the solid state memory in response to a read request, the means for reading including means for translating a magnetic disk address into a solid state memory address, means for seeking to a specified address, and means for transferring data from the solid state memory to the software requesting service;

firmware means responsive to the determining means for writing to the solid state memory in response to a write request, the means for writing including means for translating a magnetic disk address into a solid state memory address, means for seeking to a specified address, and means for transferring data from the software making the request to the solid state memory; and means for preventing operation of said reading means and said writing means after completion of the received request until receipt of a subsequent request by said receiving means, whereby software written for use with magnetic disk memory may be used in a computer having solid state memory in place of magnetic disk memory.

2. The system of claim 1 wherein the emulation means further comprises firmware means for turning the solid state memory to the off state in response to a disk reset request.

3. The system of claim 1 wherein the emulation means further comprises firmware means for formatting the solid state memory in response to a format disk request from the software, the means for formatting including means for translating a magnetic disk address into a solid state memory address, means for seeking to a specified address, and means for writing a format character to a specified address.

4. The system of claim 1 wherein the emulation means further comprises firmware means for reading disk parameters in response to a software request.

5. The system of claim 1 wherein each means for translating comprises means for dividing the solid state memory into virtual disk cylinders, heads and sectors, the solid state memory having undesignated memory space if the solid state memory is not an integral multiple 18 the cylinder size.

6. The system of claim 1 wherein the emulation means further comprises firmware means for determining whether a software service request is for data on an external memory or data on the solid state memory.

7. The system of claim 1 wherein the means for transferring comprises a memory interface means in communication with the solid state memory, the interface means including a buffer and control ports.

* * * * *

UNITED STATES PATENT AND TRADEMARK OFFICE
CERTIFICATE OF CORRECTION

PATENT NO. : 5,131,089
DATED : July 14, 1992
INVENTOR(S) : James F. Cole

It is certified that error appears in the above-indentified patent and that said Letters Patent is hereby corrected as shown below:

In column 6, at claim 5, in line 6, change "18" to --of--.

Signed and Sealed this

Tenth Day of April, 2001

Attest:

NICHOLAS P. GODICI

*Attesting Officer*     Acting Director of the United States Patent and Trademark Office